US010502614B2

(12) United States Patent
Batsikouras

(10) Patent No.: US 10,502,614 B2
(45) Date of Patent: Dec. 10, 2019

(54) MULTI-FUNCTION SMART SCALE FOR USE WITH FOOD

(71) Applicant: Nicolaos Batsikouras, Romeo, MI (US)

(72) Inventor: Nicolaos Batsikouras, Romeo, MI (US)

(*) Notice: Subject to any disclaimer, the term of this patent is extended or adjusted under 35 U.S.C. 154(b) by 52 days.

(21) Appl. No.: 14/922,644

(22) Filed: Oct. 26, 2015

(65) Prior Publication Data

US 2016/0252390 A1    Sep. 1, 2016

Related U.S. Application Data

(60) Provisional application No. 62/126,389, filed on Feb. 27, 2015.

(51) Int. Cl.
| | |
|---|---|
| *G01G 21/22* | (2006.01) |
| *G01G 21/28* | (2006.01) |
| *G01G 19/52* | (2006.01) |
| *G01G 23/36* | (2006.01) |

(52) U.S. Cl.
CPC .............. *G01G 23/36* (2013.01); *G01G 19/52* (2013.01); *G01G 21/22* (2013.01); *G01G 21/28* (2013.01)

(58) Field of Classification Search
CPC ........ G01G 21/22; G01G 21/28; G01G 23/36; G01G 19/52
See application file for complete search history.

(56) References Cited

U.S. PATENT DOCUMENTS

| | | | | |
|---|---|---|---|---|
| 4,476,946 A * | 10/1984 | Smith | ................. | G01G 3/1402 177/144 |
| 5,388,043 A * | 2/1995 | Hettinger | ............ | G01G 19/4146 128/921 |
| 6,797,894 B2 * | 9/2004 | Montagnino | .......... | G01G 21/22 177/238 |
| 7,550,683 B2 * | 6/2009 | Daughtry | ............ | G01G 19/4146 177/126 |
| 7,851,711 B2 * | 12/2010 | Rump | ................. | G01G 19/4146 128/921 |
| 9,364,106 B1 * | 6/2016 | Ortiz | ..................... | A47G 19/025 |
| 2010/0038149 A1 * | 2/2010 | Corel | ..................... | G01G 19/52 177/25.16 |
| 2011/0168456 A1 * | 7/2011 | Sharawi | ............ | G01G 23/3728 177/25.16 |
| 2012/0259582 A1 * | 10/2012 | Gloger | ..................... | B25J 11/00 702/173 |
| 2013/0029298 A1 * | 1/2013 | Batsikouras | ....... | G01G 19/4146 434/127 |

(Continued)

*Primary Examiner* — Natalie Huls
(74) *Attorney, Agent, or Firm* — MU P.C.

(57) ABSTRACT

A multi-function smart scale has a single surface platform. The platform has two or more regions for receiving items to be weighed. Each of the regions has at least one weight sensor dedicated to the region. Each of the sensors and one or more displays are in communication with the microprocessor, such that the microprocessor is configured to provide an independent data analysis for each of the two or more regions that can be displayed for the user. A user can input data into the scale using an integrated or remote keypad. Additionally, and or alternatively, the scale can receive data from the user through the use of voice or image recognition software. The scale can serve as a mobile unit. Alternatively the scale can be integrated into a work/cooking/food preparation surface, or the entire work/cooking/food preparation surface can serve as the platform.

9 Claims, 5 Drawing Sheets

(56) References Cited

U.S. PATENT DOCUMENTS

| | | | | |
|---|---|---|---|---|
| 2013/0112489 A1* | 5/2013 | Aschke | ................. | G01G 19/44 |
| | | | | 177/244 |
| 2013/0157232 A1* | 6/2013 | Ehrenkranz | ........ | G01G 19/4146 |
| | | | | 434/127 |
| 2014/0182950 A1* | 7/2014 | Groman | ............ | G01G 19/4144 |
| | | | | 177/1 |
| 2014/0251005 A1* | 9/2014 | Curry | ................. | G01F 23/0007 |
| | | | | 73/290 R |
| 2014/0332289 A1* | 11/2014 | Gallagher, Jr. | ...... | G01G 19/414 |
| | | | | 177/1 |
| 2015/0168365 A1* | 6/2015 | Connor | ................. | G01N 33/02 |
| | | | | 356/51 |
| 2015/0260566 A1* | 9/2015 | Conder | ................. | G01G 19/52 |
| | | | | 177/25.13 |

* cited by examiner

MULTI-FUNCTION SMART SCALE FOR USE WITH FOOD

CROSS-REFERENCE TO RELATED APPLICATION(S)

The present application claims priority to U.S. Provisional Patent Application No. 62/126,389 filed on Feb. 27, 2015, entitled "MULTI-FUNCTION SMART SCALE" the entire disclosure of which is incorporated by reference herein.

BACKGROUND OF THE INVENTION

1. Field of the Invention

The present invention relates generally to a multi-function smart scale, and more specifically, a smart scale that has two or more regions with sensors for weighing, analyzing and providing useful feedback on one or more food items at a time.

2. Description of Related Art

Food scales can be cumbersome and difficult to use and are oftentimes only capable of weighing a single item at a time. Even advanced state of the art scales are incapable of weighing multiple items simultaneously and providing detailed, independent analysis of the different food items being weighed, for example an identification of the item(s) being weighed or a detailed nutritional analysis of the item(s) being weighed. Additionally, food scales can be difficult to clean when food spills on them, creating the potential for bacterial and/or mold growth and contamination of other foods being weighed.

While food scales have been developed that allow multiple food items to be weighed simultaneously, they require using multiple plates or a single partitioned container. Currently, scales that are capable of weighing multiple food items simultaneously, are incapable of differentiating between, and providing accurate analysis for, food items that are positioned across two or more regions or compartments.

Based on the foregoing, there is a need in the art for a multi-function smart scale having two or more regions that is capable of analyzing one or more items simultaneously wherein an analysis for a single item can be accurately calculated across multiple regions, and wherein the various regions can be analyzed separately and collectively for multiple item analysis. Furthermore, there is a need for a smart scale having a non-partitioned weighing surface, making both using and cleaning the scale a simple task. Finally, there is a need for a scale that is capable of recognizing item(s) placed on the scale, selecting the recognized item(s) from a list, retrieving and providing nutritional information pertaining to the item(s), and providing dietary suggestions to a user based on the user's dietary desires and/or needs.

SUMMARY OF THE INVENTION

The present invention is a multi-function smart scale that has a single, non-partitioned surface platform having two or more regions. Two or more sensors are in communication with an underside of the platform, wherein each of the regions has at least one sensor dedicated to the region. As items are placed on each of the respective regions, the weight and other computed values corresponding to the items within each region are separately shown on a display. A microprocessor is in communication with each of the sensors, the display, and a power supply. The microprocessor is configured to provide an independent data analysis for each of the two or more regions.

In an embodiment, the multi-function smart scale microprocessor has a logic that assigns a weight of an item placed across multiple regions to the region detecting the greatest weight. The weight of the item detected by the remaining regions is subtracted from those respective regions.

In an embodiment, the multi-function smart scale has a housing in communication with the platform. The multi-function smart scale may have a touch keypad electrically connected to, and in communication with, the microprocessor. The multi-function smart scale may have software selected from the group consisting of voice recognition software and image recognition software.

In an embodiment, the multi-function smart scale has a camera in communication with the microprocessor. Image recognition software translates data from the camera, such as recognition of an item on the scale, and the microprocessor analyzes the translated data and provides detailed analytics of the item(s) to the user.

In an embodiment, the platform of the multi-function smart scale is sealingly integrated within a working surface such as a kitchen counter. The scale may be concealed beneath or within a working surface, wherein an upper surface of the platform is in communication with an underside of the working surface.

In an embodiment, the platform of the scale is a stovetop or other cooking surface, a countertop, a tabletop, a bar top, or other work/food preparation surface. The scale may be Wi-Fi-enabled and is configured to communicate with one or more remote devices. The multi-function smart scale may have one or more ports, allowing peripheral devices to connect to, and communicate with, the scale. The microprocessor may have firmware that analyzes data received by or from the scale.

In an embodiment, a mobile application communicates with the scale using image recognition technology, or other similar technology, to analyze food compositions and nutritional data. In a further embodiment, the application may be used to develop meal plans based on a user's individual needs and/or desires. In yet a further embodiment, the application communicates a list of grocery items, based on the meal plans, to a local grocery supply store that packages the requested list of items for the user in preparation for either store pick-up or home delivery.

The foregoing, and other features and advantages of the invention, will be apparent from the following, more particular description of the preferred embodiments of the invention, the accompanying drawings, and the claims.

DETAILED DESCRIPTION OF THE INVENTION

Figure 1:
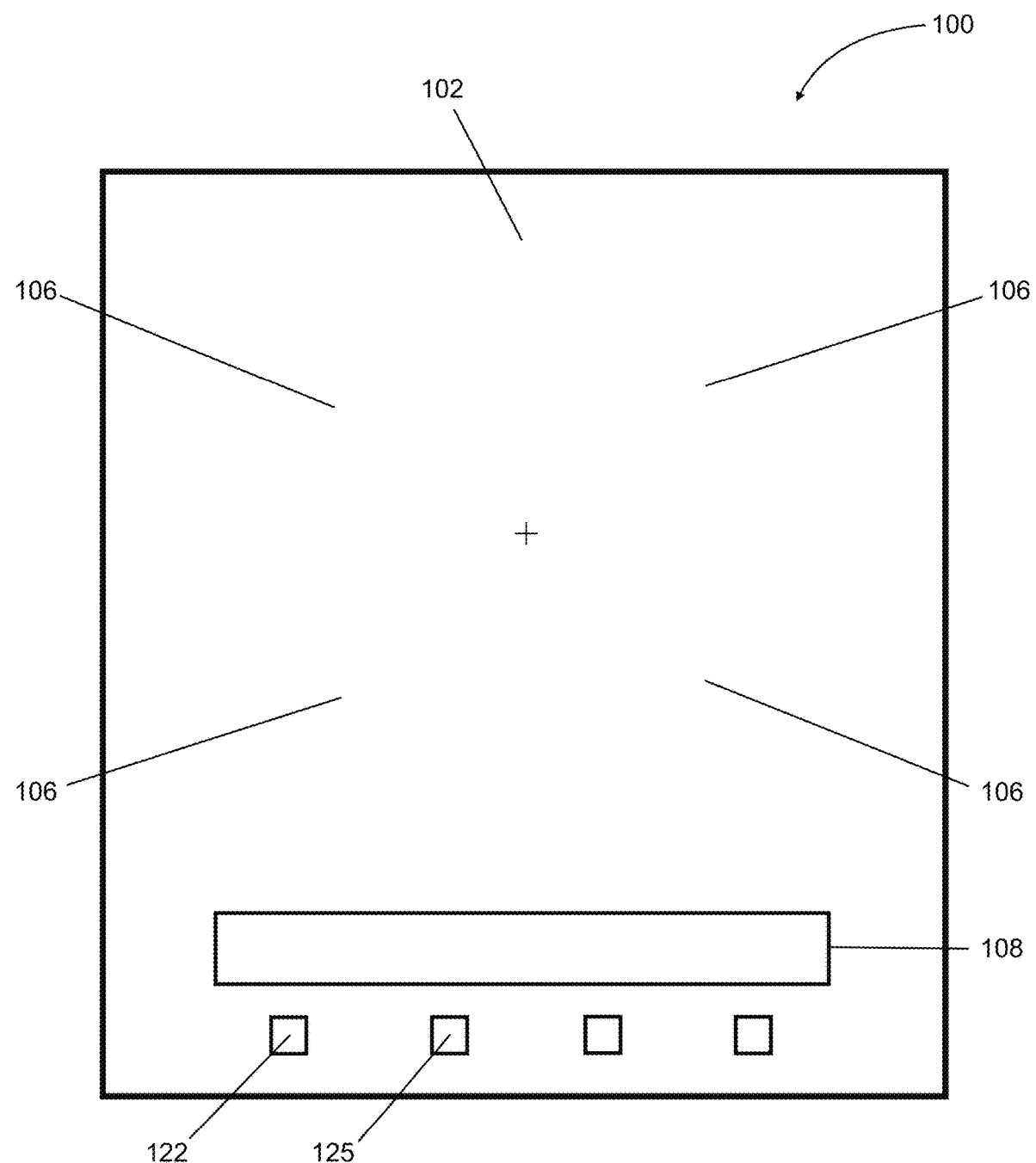
FIG. 1 shows a top plan view of the multi-function smart scale, according to an embodiment of the present invention.
Figure 3A:
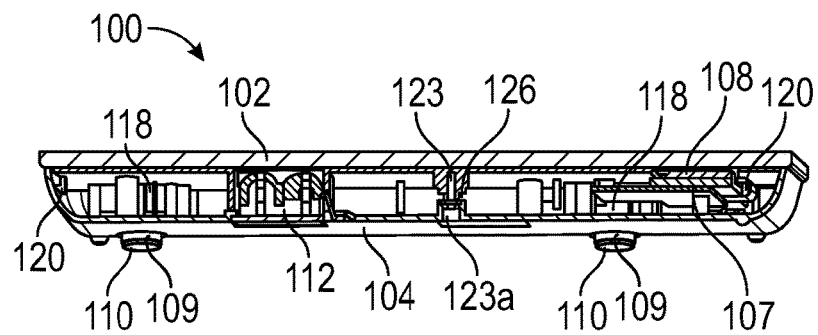
FIG. 3A shows a cross-sectional view of the multi-function smart scale, according to an embodiment of the present invention.
Figure 5:
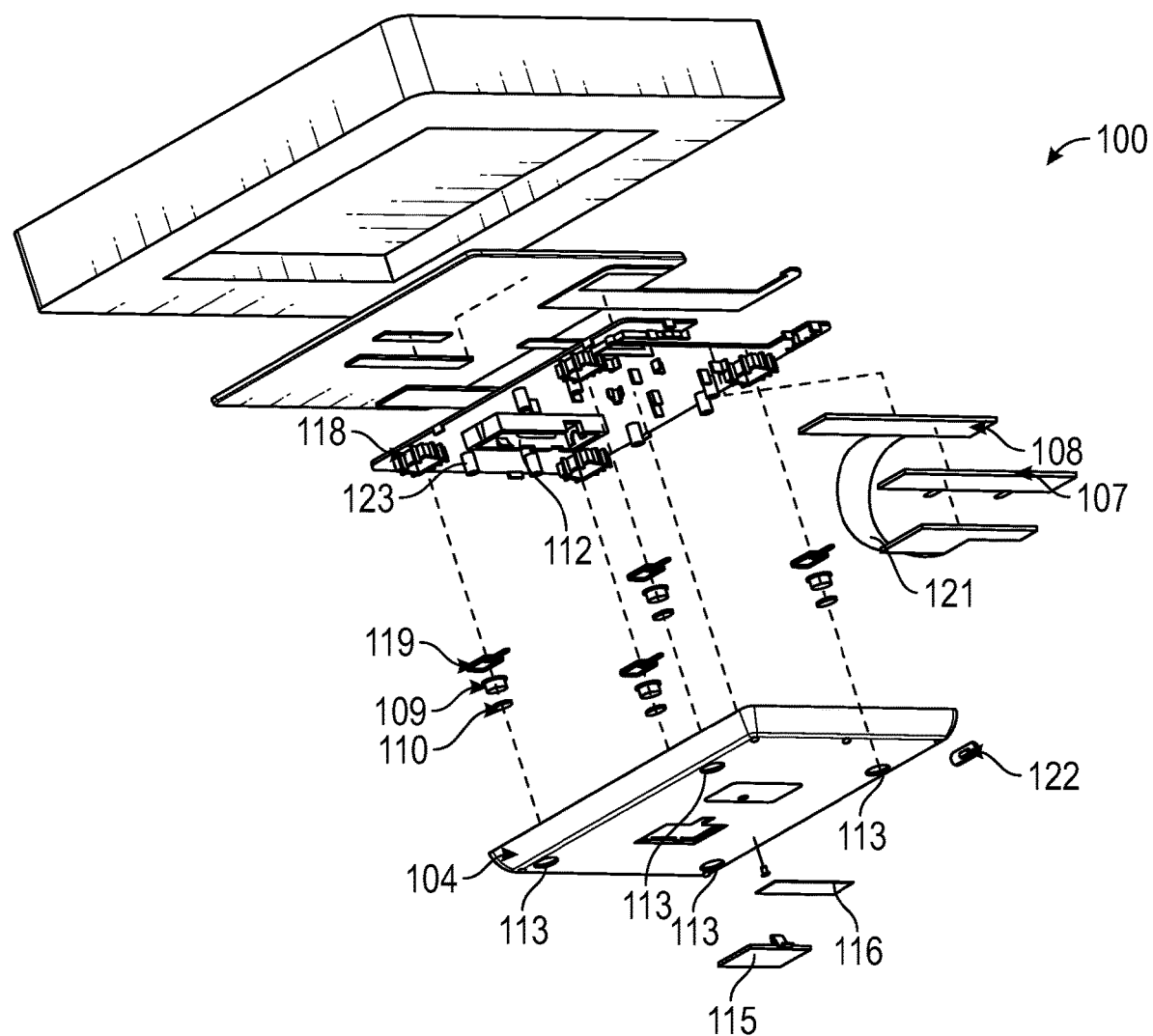
FIG. 5 shows an exploded perspective view of the multi-function smart scale, according to an embodiment of the present invention.

With reference to FIGS. 1, 3, and 5, a multi-function smart scale is shown. A scale system 100 includes a platform 102 and a housing 104. Scale system 100 enables individual or collective weighing of one or more items positioned on the platform 102. Platform 102 is a generally flat surface located on the housing 104 and has two or more regions 106 for receiving items, such as foods and liquids, to be weighed and/or analyzed. For example, FIG. 1 shows a scale system 100 having four independent regions 106. With reference to FIG. 5, each region 106 in scale system 100 has one or more weight sensors 103 in communication with the underside of platform 102. Each weight sensor 103 has an upper support structure 118 in communication with the underside of the platform 102, a lower support structure 109, a sensing device 119 between the upper and lower support structures 118, 109, and optionally, a non-skid pad 110 attached to the bottom of the lower support structure 109. As items are placed on each of the respective regions 106, the analytics, such as weight, caloric content, etc. corresponding to the items within each region 106, are separately shown on one or more displays 108.

With reference to FIGS. 3A to 5, in an embodiment, the platform 102 is removably connected to the housing 104 using a plurality of snap-fit connectors 120 along the perimeter of the platform 102 and the housing 104. One reasonably skilled in the art would understand and appreciate that other connectors could be used in addition to, or in lieu of, the snap-fit connectors without deviating from the scope of the present invention. The ability to remove the housing 104 from the platform 102 allows a user to access the interior of the scale system 100 and hence, easily clean, maintain and/or repair the scale.

In an embodiment, a gasket or other sealing element (not shown) is used to sealingly engage the platform 102 to the housing 104 to prevent solid or liquid contaminants from accessing the interior of the scale and potentially interfering with, and/or damaging, the various electronic components within the scale. Furthermore, by preventing infiltration of contaminants into the scale system 100, the sealing element prevents harboring or growth of bacteria and/or mold within the scale system 100.

In an embodiment rubber or silicone non-slip pads (not shown) extend from the bottom of the housing 104 to prevent the scale from sliding. One skilled in the art would appreciate that other non-slip materials could be used without deviating from the scope of the invention.

The multi-function smart scale has a battery compartment 112, accessible from the underside of the housing 104, by way of a removable cover 115, for receiving one or more batteries to provide power to the scale. In an alternative embodiment, the scale is hard-wired to an electrical system (not shown), or is equipped with a power cord (not shown) or a rechargeable battery with a charger that can be plugged into an electrical outlet, as a means for powering the scale.

A microprocessor 107 is located within the housing 104, and is accessible from the underside of the housing 104 by a removable cover 116. In an embodiment, the microprocessor 107 has firmware that analyzes data received by or from the scale. The removable cover 116 allows a user to easily access the microprocessor 107 for repair or maintenance. The microprocessor 107 receives data, for example from the sensors 103 and/or a user, analyzes the data, and transmits information based on the analysis to the user via the display 108 connected to the microprocessor by wiring 121, or alternatively or additionally, by transmitting it to an external device using a Wi-Fi, Bluetooth, or other similar wireless transmitter 117, known to one reasonably skilled in the art, contained within the housing 104.

In an embodiment, an on/off power switch 122 is integrated into the platform 102 (see FIG. 1). Alternatively, the power switch may be integrated into the housing 104 (see FIG. 5). In an alternative embodiment, the power switch is located on the display 108, or the scale is always on and "wakes" when the sensors move, for example in the case when an object is positioned thereon.

A plurality of support members 123 extend downward from the underside of the platform 102 and matingly engage with a plurality of support members 123a (see FIG. 3) that extend upward from the interior of the housing 104. In an embodiment, the support members 123, 123a are male and female connectors, respectively, or vice versa that releasably engage with one another, for example, via a friction fit or a snap fit. Together, the support members 123, 123a form a plurality of structural support beams 126 within the scale's interior to prevent the platform 102 from collapsing and/or bending.

Figure 3B:
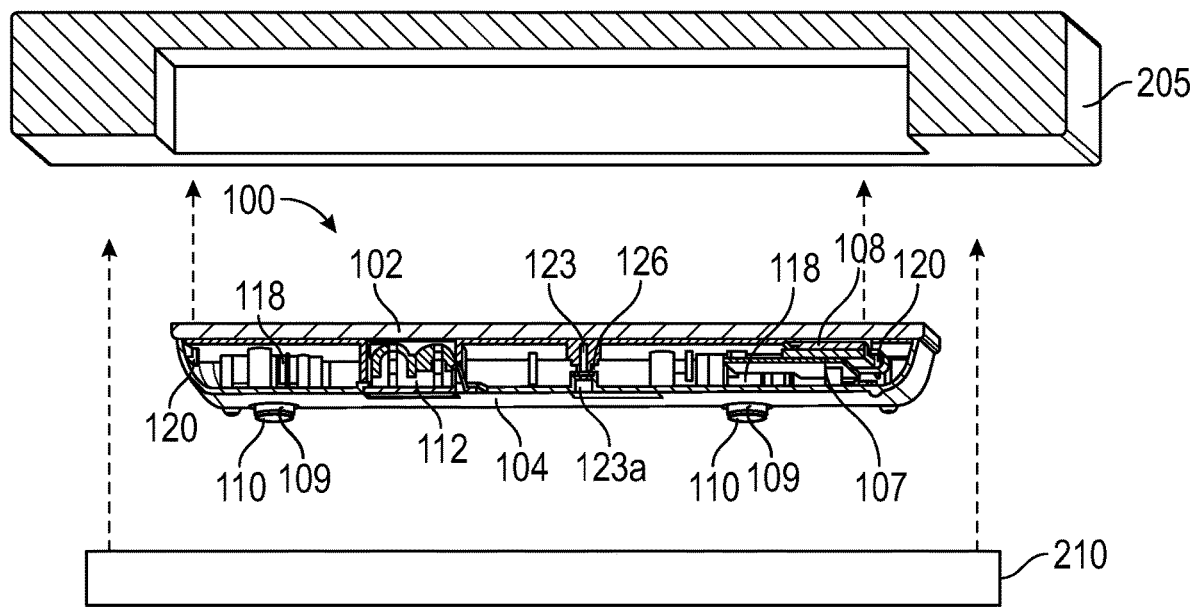
FIG. 3B shows a cross-sectional view of the multi-function smart scale, according to another embodiment of the present invention.
Figure 3C:
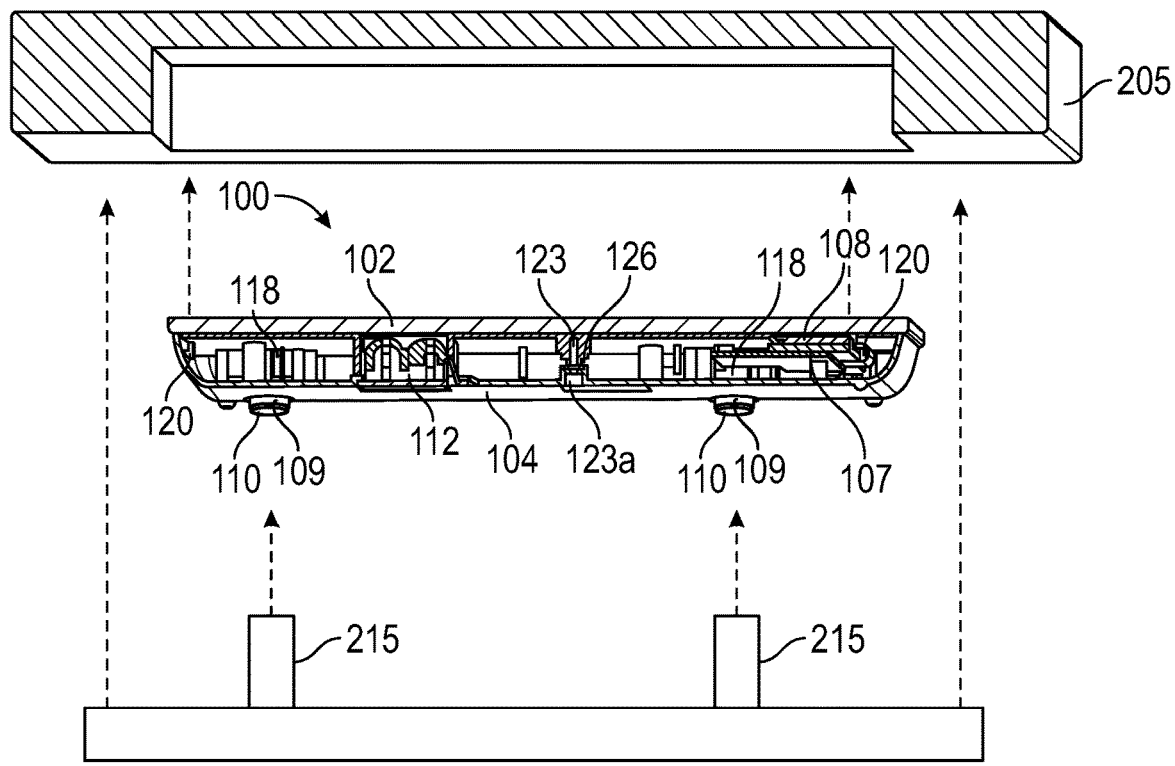
FIG. 3C shows a cross-sectional view of the multi-function smart scale, according to yet another embodiment of the present invention.

With reference to FIG. 3B, an embodiment is displayed with a horizontal support structure 210 to support a scale system 100 within a work surface 205. Similarly, with reference to FIG. 3C, an embodiment is displayed with a vertical support structure 215 to support a scale system 100 within a work surface 205.

Figure 4:
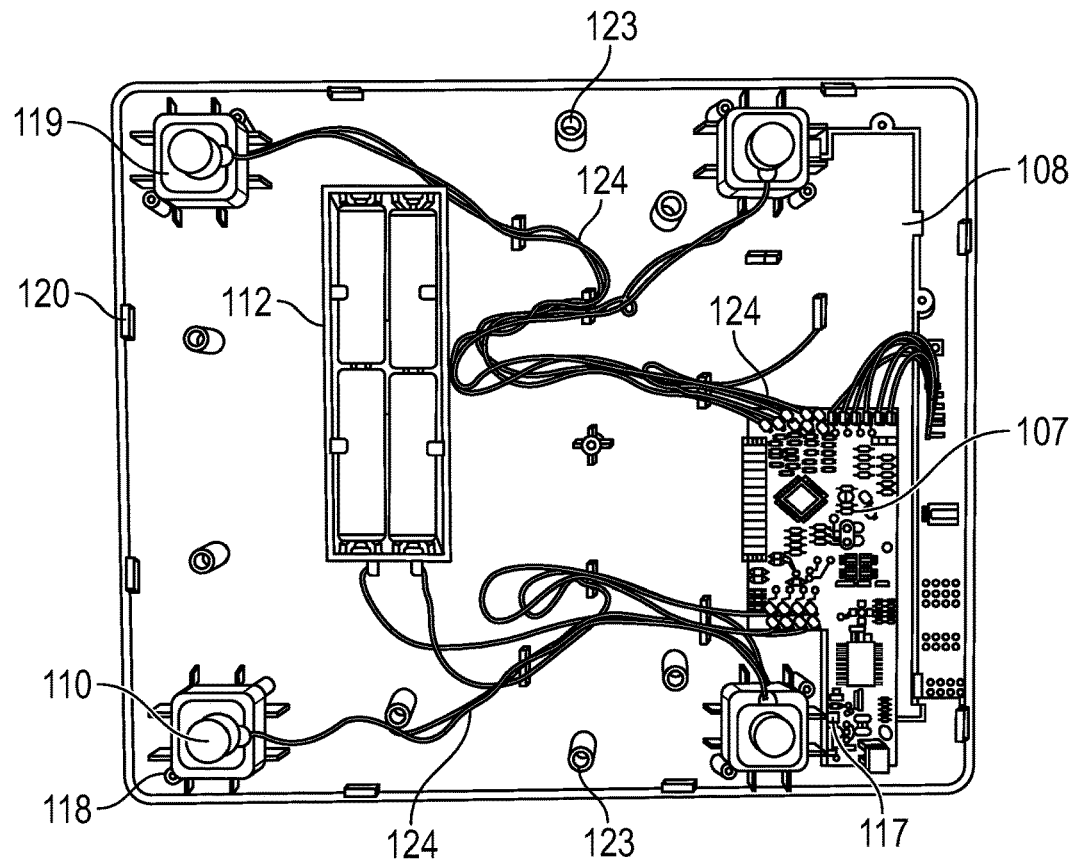
FIG. 4 shows an interior view of the multi-function smart scale, according to an embodiment of the present invention.

With reference to FIG. 4, the various components described herein, such as the sensors 103, the power source compartment 112, the microprocessor 107, the wireless transmitter 117, and the display 108 communicate with one another electronically through electrical wiring 121, 124.

When a food item is placed on a region 106, one or more weight sensors 103, in collaboration with the microprocessor 107, calculate a weight of the item. In an embodiment, if a food item is positioned on more than one region 106, the scale will determine the region 106 bearing the greatest load, i.e. having the greatest weight thereon. Once the region 106 of greatest weight has been determined, the microprocessor 107 will zero (tare) out the weight associated with the item, as detected by the remaining regions 106, and will add the weight that was zeroed out to the calculated weight of the region 106 bearing the greatest load. The total weight registered by the regions 106 equals the total weight on the surface of the scale. In this way, food that is placed over multiple regions 106 is properly assigned and analyzed, and is not improperly mis-assigned to the incorrect region 106 or miscounted as another type of food.

In an embodiment, the scale system 100 is configured to detect and/or analyze object(s) located within the periphery of a region 106.

In an embodiment, the user can manually tare, via a tare button 125 (see FIG. 1), any given region 106 at any given time. This allows the user to analyze a multiplicity of items while adding each item to a single region 106, and alleviates the need to weigh ingredients prior to adding them to the recipe. For example, if the user is making a recipe that calls for three different ingredients with various weights, the user can add the specified amount of the first ingredient to the region 106. Once added, the user would tare the region 106. The user would then add the second and third ingredients in succession to the same region 106, making sure to tare the region 106 after adding the desired amount of the second ingredient.

The microprocessor 107 combines the weight and other information collected by the scale (such as identification of the food type by camera) with data inputted by the user to calculate various nutritional information of the food item(s). The weights of items contained within, and/or overlapping, the various regions 106 may be determined using any known method for calculating and/or estimating distributed weights. The weights and other nutritional information may be shown using one or more screens on the platform 102 or housing 104 of the scale. The weight and associated calorie count/points, in addition to other nutritional information, of the items located within the regions 106 may be individually determined per region 106 or collectively calculated across multiple regions 106.

In an embodiment, the weight sensors 103 protrude through corresponding holes 113 in the bottom of the housing 104, and act as the scale's feet. In order to calculate the weight of a food item(s), the sensors 103 must be in contact with a solid surface, such that when the weight of the item(s) exerts downward force on the platform 102, the sensor(s) 103 are capable of computing the force, i.e. the weight, of the given item(s).

In an alternative embodiment, the weight sensors 103 are concealed within the housing 104, and are supported by the bottom interior surface of the housing 104, an extension therefrom, or some other support structure within the housing 104 that would be understood and appreciated by one skilled in the art without deviating from the scope of the invention, such that when the weight of an item(s) exerts downward force on the platform 102, the sensor(s) 103 are capable of computing the force, i.e. the weight, of the given item(s). In such an embodiment, platform 102 and housing 104 would move relative to one another, to permit sensors 103 to register weight on the platform 102.

In the event a user would like to weigh a plate of food on the platform 102, an empty plate (not shown) is placed on the scale, and the scale is tared prior to adding the food to the plate. This takes the weight of the plate out of the final calculation. Once the scale has been tared, food is added to the plate and is organized in a manner that generally corresponds to the regions 106 of the platform 102. As food is added to the plate, each of the weight sensors 103 recognizes the weight of its region 106 and is able to transmit the weight to the microprocessor 107, which calculates calories, etc., providing a detailed analysis to the user regarding the nutritional information of the food items on the plate. The scale is able to determine the absolute weight and nutritional analysis of the food on the plate, as well as the regional weights and nutritional analyses based on the placement of the food by the user on the plate, as the placement corresponds to the general location of the regions 106 of the platform 102.

When a user wishes to weigh more than one type of food, the user manually inputs data into the scale system 100 via an integrated or remote keypad. In an embodiment, the keypad is electrically connected to the microprocessor 107. In another embodiment, the keypad wirelessly communicates with the microprocessor using wifi, Bluetooth technology, or some other wireless technology known to one reasonably skilled in the art. Additionally, and/or alternatively, the user inputs data into the scale system 100 using voice recognition software. Examples of data communicated by the user include the type(s) of food(s) that he/she wishes to weigh, as well as the regional placement of the food item(s) on the platform 102. By receiving instruction on the food type, the microprocessor 107 is able to accurately assess the nutritional information, in addition to weight, of the item(s). This prevents the microprocessor 107 from mistakenly identifying separate foods as a single food item when the user wishes to analyze more than one type of food within, or among, the region(s) 106. Once the scale has received the user's instructions, the user places the food on the scale in its appropriate region(s) 106 for nutritional analysis.

The weight of items is presented for viewing via display 108. Information associated with the weight of the items located within regions 106 may be presented individually and/or as a cumulative weight via display 108. In addition to weight, other information, such as caloric and nutritional content, are presented for viewing via display 108.

Regions 106 may be noted for identification. For example, a region 106 may be configured as "region #1". Region identification information may be communicated from platform 102 to housing 104. Non-limiting examples for communication between platform 102 and housing 104 include barcode, LED and RF Identification (RFID). Information associated with the contents of the regions 106 may be communicated via display 108.

In an embodiment, there are multiple displays 108, wherein each display 108 is dedicated to a specific region 106, displaying only the weight and/or nutritional information of items within, or overlapping from, the specific region 106 for which that display 108 is dedicated. In an alternative embodiment, there is a single display 108 that displays collective and individually calculated information for all region(s) 106.

The weight of item(s) within, and/or overlapping from, the region(s) 106 is detected and calculated by the sensor(s) 102 to determine the weight of the item(s) located within each region 106 or all region(s) 106, collectively. Furthermore, calorie or point information, as well as other nutritional information associated with the item(s) located within, or overlapping from, a region 106, is determined and communicated to the user via display 108.

Figure 2:
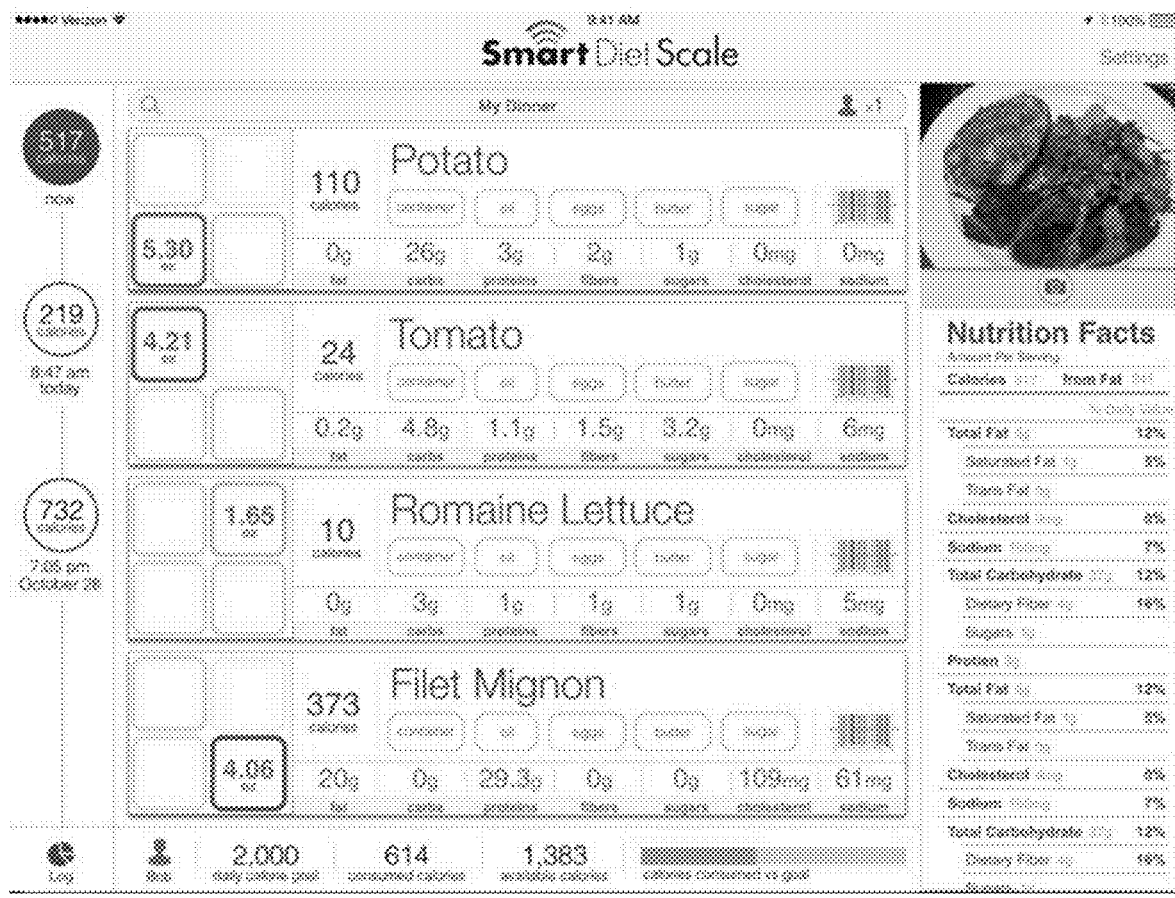
FIG. 2 shows a screen shot of a multi-function smart scale application on an electronic device, according to an embodiment of the present invention.

Scale system 100 provides capability for communication with computing devices. Non-limiting examples for computing devices include notebook computer, smartphone and other handheld computer and mobile communication devices, such as a tablet computer, shown in FIG. 2. As a non-limiting example, scale system 100 may communicate with computing devices via wireless, wired and/or infrared means. As a non-limiting example, communication may be provided via Universal Serial Bus (USB), an antenna, Bluetooth™ technologies or other wireless technologies to exchange information with external wireless devices. In one embodiment, the external wireless device may have a mobile application program, or "app", as shown in FIG. 2, that is in communication with scale system 100 that allows a user to record and track weighed items and nutritional information. In an embodiment, the nutritional information comprises the total calories of the day thus far, and the total calories of individual meals. The information also provides information of the calories of each region, namely the weight, the calories, the type of food, and a breakdown of the fat, carbohydrates, proteins, fibers, sugars, cholesterol, and sodium, among other nutritional information pertaining to that type of food. The information may be stored in a database to review at a further time and for compilation of statistics. The information may also show a daily caloric intake limit, and the number of calories consumed and remaining Additionally, for each food type a standard label may be retrieved from a database to indicate, in a form with which the consumer is comfortable, the nutritional information.

In an embodiment, scale system 100 has one or more ports (not shown) for connecting to, and communicating with, peripheral devices. In an embodiment, the scale system 100 is capable of charging batteries of peripherally connected electronic devices through the one or more ports. Similarly, the scale system's batteries can be charged by electrically connecting to a peripheral device through the one or more ports. One reasonably skilled in the art would understand and appreciate that other charging methods could be used without deviating from the scope of the present invention.

Scale system 100 may also include an item identifier (not shown), which identifies an item that is placed onto platform 102. Item identifier (not shown) may be in communication with an item database (not shown), where item database (not shown) includes information for a plurality of different items. Item identifier (not shown) will first identify the item placed onto platform 102, then select said item from item database, retrieve information stored in the item database that is associated with said item, and finally present information for viewing via display 108. Non-limiting examples of an item identifier may be a camera using photo-recognition software such as Google Goggles™ app, for example, or a sensor, such as a bar-code sensor that scans the bar code on a packaged food item. Scale system 100 may also receive information from a user, confirming the types of food items on the scale, through a microphone, keyboard or touch interface. Audio information may be received and processed for any known language. The information received from user could also be inputted and stored in an item database (not shown) for future use. In an embodiment, scale system may also include an intelligent diet analyzer, which recognizes the items weighed most often by the user in order to output suggestions, substitutions and recommendations based on personal weight management goals or ideal nutritional intake based on the user's habits or lifestyle.

In an embodiment, a user can manually input food identification data into the scale prior to, or while, weighing the item(s) using a touch keypad on the exterior of the housing 104 or platform 102 or a remote device.

In an alternative embodiment, a user can communicate food identification data to the scale prior to, or while, weighing the food item(s) using voice recognition software.

In a further alternative embodiment, a user can analyze the nutritional information of a food item using a mobile application in conjunction with the scale, in which the analysis is initiated when a user takes a photo of the food item(s) with his/her smart mobile device. The application uses image recognition software to analyze and process the data to determine what type of food is being weighed. In an alternative embodiment, the camera used to photograph the food item(s) is in communication with the scale. The application uses image recognition to analyze and process the data to determine what type of food is being weighed.

Once the food item(s) has been identified by the application and/or the smart scale, the scale uses that information in addition to the calculated weight of the food item(s) for analysis by the application. Using remotely accessible banks of various food and nutritional data, the application calculates the nutritional data of the user's food items and provides the user with various information, for example, relating to ingredients of the food being analyzed, allergies associated with the foods being analyzed, as well as the weight and nutritional information thereof In an embodiment, scale system 100 may be portable and meant for countertop or tabletop use. Platform 102 may be configured for washing and immersion in water, and may be microwave-safe. In this embodiment, the scale operates on the surface of a countertop, in which the sensors 103, acting as legs, or the housing 104 sits directly on the countertop. This embodiment provides a mobile scale that the user can store when not in use, or take with him/her wherever he/she goes for on-the-go food analysis.

In an alternative embodiment, the scale system 100 is integrated into the user's stovetop, countertop, tabletop, bar top or other work/cooking/food preparation surface and serves as a fixed appliance, in which the upper surface of the platform 102 is continuous, i.e. flush, with the surface. In an embodiment, a gasket, caulking or other sealing element (not shown) extends around the perimeter of the platform 102 and sealingly engages with the surface to prevent infiltration of particles, liquids or other contaminants between the surface and the platform 102. The sensors 103 or the housing 104 (if the sensors 103 are concealed within the housing 104) are supported laterally and vertically by a support system below the work/cooking/food preparation surface to allow the scale system 100 to support and accurately weigh and analyze items placed on the scale system 100. Such support system would be understood and appreciated by one skilled in the art.

In an alternative embodiment, the stovetop, countertop, tabletop, bar top or other work/cooking/food preparation surface is the platform 102. This allows the user to utilize the entire cooking/work/food preparation surface to weigh and analyze food items. This is especially beneficial in commercial settings that require larger scale food production and strict scrutiny of the portion size being prepared. It is also beneficial in cooking, as it allows a user to add ingredients, in precise measured amounts, to cooking receptacles while cooking without the need for measuring in advance. The sensors 103 or the housing 104 (if the sensors 103 are concealed within the housing 104) are supported laterally and vertically by a support system below the work/cooking/food preparation surface to allow the scale system 100 to support and accurately weigh and analyze items placed on the scale system 100. Such support system would be understood and appreciated by one skilled in the art.

In an embodiment, the scale system 100 is associated with an application ("app") for a mobile device or computer. The app may contain, or have access to via the Internet, such items as a food database containing dietary analyses of food options, grocery items with UPC codes, and restaurant items. The app permits the storage of periodic meal and fitness goals.

In an embodiment, the smart scale app interfaces with an exercise app. There may be capability for several different users, with comparison of dietary goals and progress between the users, along with health information. The nutritional food apps are displayed on a mobile device such as tablet or smart phone, giving you an accurate count of the nutritional value of your entire meal all simultaneously. The smart scale app helps a person lose weight over traditional diets, as it has been shown that dieters who track their food intake are twice as likely to achieve and maintain their weight loss goals.

In an embodiment, an application for use with the scale allows a user to plan meals based on nutritional goals and/or needs. For example, if the user has a certain dietary, or other restriction or requirement due to a medical condition, diet or budget, the user can input information such as caloric thresholds, budget, allergies, etc., and the application provides a list of meal selections based on the information provided. Based on the user's selection of meals, the application generates a list of grocery items and transmits the data to a grocery provider in the form of a grocery list. This allows the user to avoid the hassle of the grocery store by having the groceries either prepared by the grocer for pick-up, or in the alternative, delivered to him/her at his/her home or other location.

Scale system 100 provides capability for processing information associated with weight management goals. In an embodiment, a user may provide information such as age, weight, activity level, gender and scale system 100 provides a daily plan for meeting the goal by processing and presenting a calorie or point budget. Furthermore, scale system 100 provides capability to receive, process and track information associated with food and liquid intake on a daily, weekly, monthly and/or yearly basis. Furthermore, scale system 100 provides graphical information associated with meeting or exceeding daily plan and goals. As a non-limiting example, scale system 100 may inform a user of exceeding food/liquid intake goal or plan. As another non-limiting example, scale system 100 may reduce food/liquid intake plan/goal for a day where food/liquid intake is exceeded. Scale system 100 receives, processes and tracks food/liquid intake on a daily, weekly, monthly, yearly basis for providing information associated with meeting plan/goal. Scale system 100 receives, processes and presents information associated with exercise programs and special diet programs. Non-limiting examples of special diet programs include diabetic, high blood pressure, housing builders and other associated medical related diets. Scale system 100 may also provide educational information associated with weight management and portion sizing.

Scale system 100 provides capability to support a multiplicity of users where scale system 100 process information based upon user identification.

Scale system 100 may be configured for a multiplicity of geometric shapes. As a non-limiting example, scale system 100 may be configured in a square shape, as shown in FIG. 1. In a preferred embodiment, platform 102 is manufactured from an aesthetically pleasing material, such as tempered glass. However, platform 102 can be made of other materials as well including rigid, semi-rigid and flexible material. In addition, in a preferred embodiment, the display 108 of the platform 102 features touch screen technology.

Scale system 100 may receive, process and present information in a multiplicity of dimensions. As a non-limiting example, scale system 100 may receive, process and present information in units of milligrams and pounds, or in metric and any other known measurement system. Scale system 100 may receive, process and present information in a multiplicity of languages. Examples of languages supported include English, Spanish and French.

Scale system 100 provides capability for processing information associated with calorie, nutrition and points systems for third party weight management programs. Furthermore, scale system 100 provides capability for processing information associated with food for restaurants and fast eating establishments. As an example, information associated with a food item placed within any region may be communicated to user via display 108. Furthermore, scale system 100 receives information from a network or from memory associated with food contained with the region(s) 106 and based upon the weight of the item presents calorie, nutrition and points information to user for viewing.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A multi-function smart scale comprising:
   a. a single non-partitioned surface platform comprising four or more regions;
   b. four or more sensors in communication with an underside of the platform, wherein each of the two or more regions has at least one sensor dedicated to the region;
   c. a microprocessor in communication with each of the four or more sensors, wherein the microprocessor is configured to provide an independent data analysis for each of the four or more regions and wherein the microprocessor has a logic configured to assign a weight of an item placed on the four or more regions to a region detecting a greatest weight, wherein the weight of the item detected by one or more remaining regions is subtracted from the one or more remaining regions;
   d. one or more displays in communication with the microprocessor;
   e. a power supply electrically connected to the microprocessor; and
   f. wherein the scale is concealed beneath a working surface, wherein an upper surface of the platform is in communication with an underside of the working surface.

2. The multi-function smart scale of claim 1, further comprising:
   a vertical support structure supporting the scale underneath the working surface.

3. The multi-function smart scale of claim 1, wherein the scale is supported by horizontal supports concealed beneath the working surface.

4. The multi-function smart scale of claim 1, further comprising a touch keypad in communication with the microprocessor.

5. The multi-function smart scale of claim 1, further comprising software selected from the group consisting of voice recognition software and image recognition software.

6. The multi-function smart scale of claim 5, further comprising a camera in communication with the microprocessor, wherein the image recognition software is configured to translate data from the camera, and wherein the microprocessor is configured to analyze the translated data.

7. The multi-function smart scale of claim 1, wherein the working surface is selected from the group consisting of a stovetop, countertop, tabletop, and bar top.

8. The multi-function smart scale of claim 1, wherein the scale is wifi-enabled and is configured to communicate with a mobile device.

9. The multi-function smart scale of claim 1, further comprising one or more ports.

* * * * *